Dec. 9, 1924.　　　　　　J. J. LA DUCER　　　　　　1,518,153
MILLING MACHINE
Filed Nov. 28, 1921　　　2 Sheets-Sheet 2
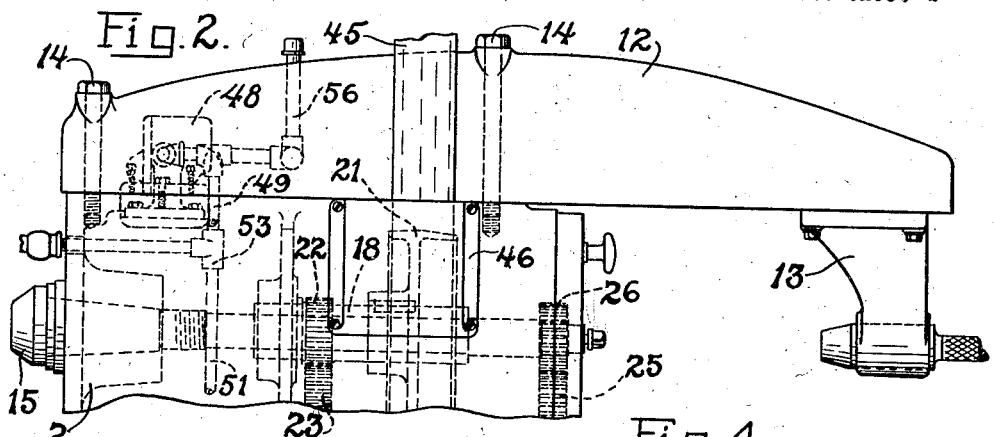
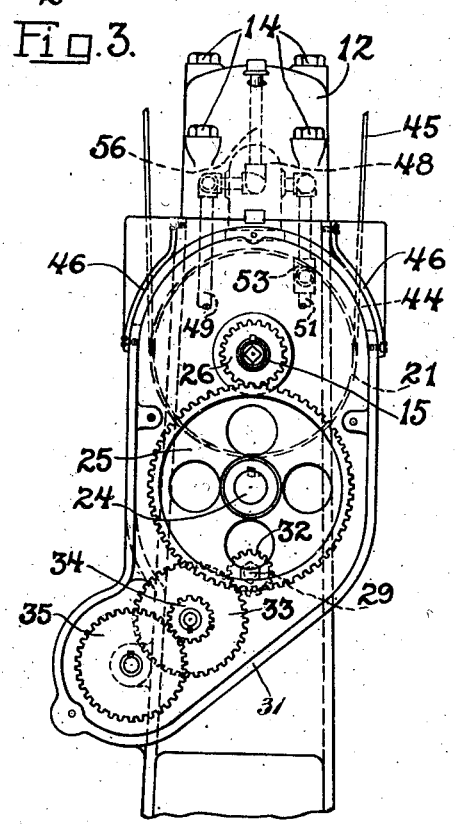
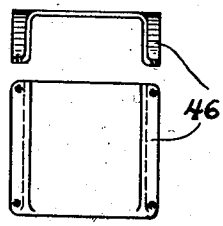
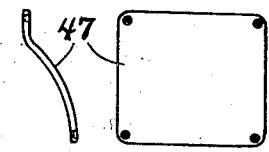
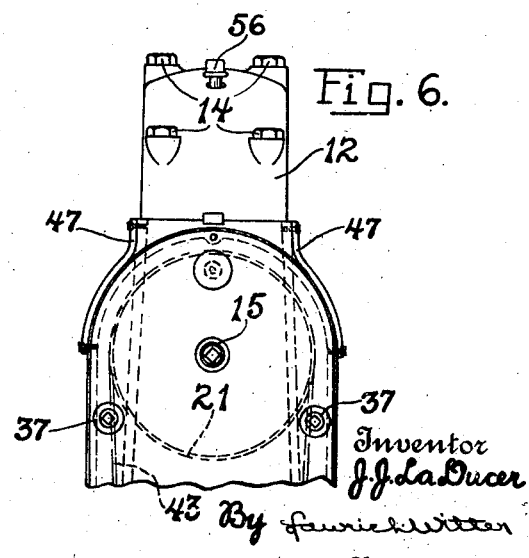

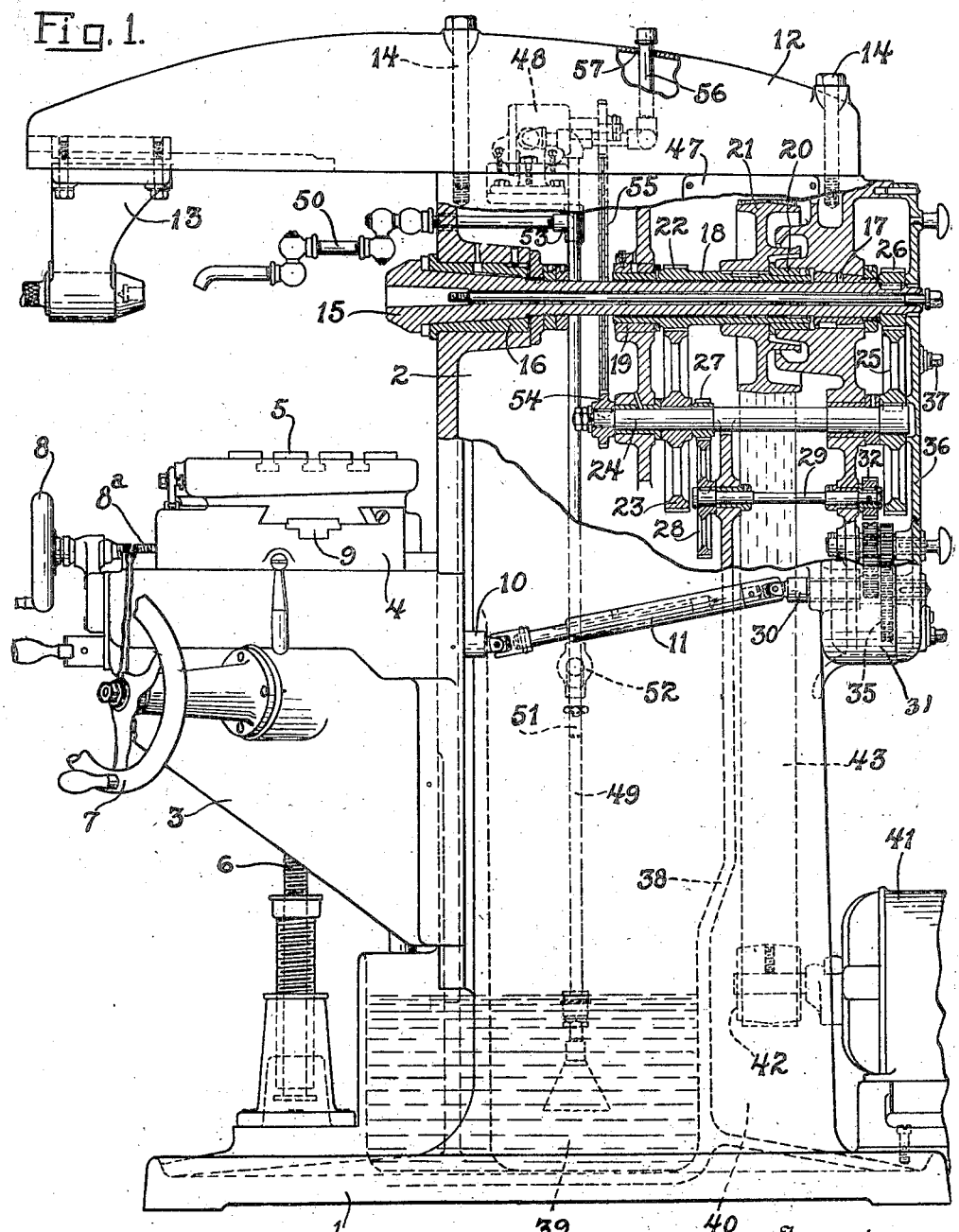

Patented Dec. 9, 1924.

1,518,153

UNITED STATES PATENT OFFICE.

JERRY J. LA DUCER, OF HARTFORD, CONNECTICUT, ASSIGNOR TO PRATT & WHITNEY COMPANY, OF NEW YORK, N. Y., A CORPORATION OF NEW JERSEY.

MILLING MACHINE.

Application filed November 28, 1921. Serial No. 518,329.

*To all whom it may concern:*

Be it known that I, JERRY J. LA DUCER, a citizen of the United States, residing at Hartford, in the county of Hartford and State of Connecticut, have invented certain new and useful Improvements in Milling Machines, of which the following is a specification.

This invention relates to metal working machines and particularly to an improved milling machines as illustrated in the accompanying drawings. The primary object of the invention is to provide an improved milling machine preferably of the column and knee type as illustrated, such improvement residing principally in the driving mechanism for the tool spindle and work feed.

It is an object of the invention to provide an improved spindle driving mechanism, preferably including change gears, such mechanism being adapted to be driven either from a motor or other power means in the base of the machine of from an overhead countershaft.

Another object of the invention is to provide an improved spindle driving mechanism including a driving sleeve loosely mounted concentrically over the spindle, the sleeve and spindle being supported in independent bearings in the machine.

Another object of the invention is to provide a milling machine having an improved spindle driving mechanism of the above type in combination with driving mechanism for the work feed therefor, such two mechanisms being driven from the same source and the speed of each being changeable independently of the other.

A further object of the invention is to provide the improved milling machine with an adjustable tool supporting overarm, the arm and column construction of the machine being such that the arm may extend outwardly at the front of the machine over the work support or may be displaced on the column to extend outwardly at the rear of the machine, thereby leaving a free working space above the support.

With the above and other objects in view, my invention consists in the features of construction and operation set forth in the following specification and illustrated in the accompanying drawings. In such drawings annexed hereto and forming a part of this specification, I have shown my invention as embodied in a milling machine but it will be understood that the invention can be otherwise embodied and that the drawings are not to be construed as defining or limiting the scope of the invention, the claims appended to this specification being relied upon for that purpose.

Referring to the figures of the drawings:

Figure 1 is a side elvation of a milling machine, partially in section, illustrating certain features of my invention.

Fig. 2 is a fragmentary elevation thereof similar to Fig. 1 but showing the tool supporting overarm adjusted to a different position on the column and the spindle as driven from above.

Fig. 3 is a rear elevation of the machine shown in Fig. 2, the overarm being mounted as shown in Fig. 1.

Fig. 4 illustrates plan and elevational views of belt guide used in combination with the machine when driving the spindle from an overhead countershaft.

Fig. 5 illustrates similar views of a cover plate used to cover the belt openings in the column when driving the spindle from the base of the machine.

Fig. 6 is a rear elevation of the machine as shown in Fig. 1.

Referring more specifically to the drawings by reference characters, 1 indicates the base and 2 the column of a milling machine illustrative of my invention. Work supporting means, comprising a knee 3 provided with a saddle 4 and a table 5 thereon, is vertically adjustable on the column by means of a screw 6. A hand wheel 7 is provided for operating the screw 6 and the saddle may be adjusted horizontally on the knee by means of a hand wheel 8 on a screw 8ᵃ. The table is provided with a rack 9 adapted to be engaged by a pinion through which the table may be operated either by hand or power in the usual and well-known manner. A power table feeding shaft 10 is provided in the knee and is adapted to be driven through a telescopic shaft connection 11 to be hereinafter described.

The column 2 has mounted thereon an overarm 12 provided with an outbearing hanger cutter arbor support 13, bolts 14 being provided for securing the overarm to the column. It may sometimes be desired to have the space above the work table 5 free and unobstructed. For this purpose the overarm may be adjusted to the position illustrated in Fig. 2 wherein the overarm extends outwardly beyond the rear of the machine. In such position, the space above the work table is unobstructed thereby adapting the work table to receive work of any height.

A tool spindle 15 is mounted in bearings 16 and 17 in the column. A driving sleeve 18 is mounted concentrically over the spindle and is supported in bearings 19 and 20. It will furthermore be noted that the sleeve is mounted in spaced relation about the spindle and is preferably driven from a belt pulley 21 keyed thereto. A gear 22 on the sleeve is in mesh with a larger gear 23 on a shaft 24 parallel with the sleeve and spindle. A second gear 25 on the shaft is illustrated as being in mesh with a gear 26 on the spindle. The spindle is therefore driven from the sleeve through gears 22 and 23, shaft 24 and gears 25 and 26. Gears 25 and 26 are interchangeable and are adapted to have other gears substituted therefor whereby the speed of the spindle relative to the sleeve may be varied.

The table feeding shaft 10 in the knee, above referred to, is adapted to be driven from the shaft 24 through the following mechanism: a gear 27 on the shaft 24 meshes with a gear 28 on a shaft 29 parallel with shaft 24. A shaft 30 in the change gear box 31 is connected to one end of the before-mentioned telescopic shaft 11. Change gear mechanism, comprising intermeshing gears 32 and 33, 34 and 35 operably connects shafts 29 and 30. All of gears 32 to 35 are removable and interchangeable whereby to vary the feeding speed of the table. It will be noted that the feeding speed of the table may be changed without in any way affecting the speed of the spindle 15 and that the spindle speed may likewise be changed without affecting the speed of the table feeding mechanism. The casing or change gear box 31 is provided with a cover plate 36 which may be readily removed by means of bolts 37.

As illustrated in dotted lines in Fig. 1 and specifically shown and described in my co-pending application Serial No. 518,330 filed on even date herewith, I provide the column with a re-enforcing and dividing web 38. This web is integral with the opposite sides of the column, extends vertically, and at its upper end provides a bearing for the shaft 29. By means of the web, the column is divided into an inner reservoir portion 39 and an open outer portion 40.

In Figs. 1 and 6 the spindle is illustrated as being driven from a motor 41 mounted on the base of the machine. The motor shaft extends into the portion 40 of the column 2 and is provided with a pulley 42 thereon operatively connected to the sleeve pulley 21 through a belt 43. The open portion 40 of the column provides a free space within the column between the pulleys 21 and 42 for receiving the belt 43.

It may sometimes be desired to operate the machine from an overhead countershaft instead of from the base thereof. In Figs. 2 and 3, I have illustrated the machine as being so operated. I provide the column with belt openings 44 adjacent the pulley 21 through which openings a belt 45 from an overhead countershaft may pass to engage the pulley. A belt guide 46 (Fig. 4) is preferably mounted on the column over each of these openings, such guides serving both as a protection to the operator and also to improve the appearance of the machine. When operating the machine from the base motor, these belt openings 44 may be covered by plates 47, (Fig. 5) adapted to be secured to the column, in the same manner as the guides 46, as illustrated in Fig. 6.

As illustrated in Figs. 1 and 2 and as more specifically described in my aforesaid co-pending application, I mount a coolant pump 48 on the column beneath the overarm 12, such pump being adapted to raise a coolant from the reservoir 39 through a pipe 49 and to discharge the same on the tool through a pipe 50. An over-flow pipe 51 provided with a relief valve 52, is connected to the discharge pipe at 53. The pump is driven from a sprocket 54 on the shaft 24 through a flexible chain belt 55. 56 illustrates a priming pipe extending from the pipe 49 adjacent the pump upwardly through an opening 57 in the top of the overarm. It should be noted that the overarm is adjustable about this pipe as an axis to the two positions illustrated in Figs. 1 and 2.

The invention as described and illustrated herein provides a compact milling machine embodying various improvements. The spindle and driving shaft or sleeve therefor are concentrically but independently mounted, thereby conserving the space within the column of the machine and at the same time avoiding the usual lateral belt driving thrust on the spindle. The arrangement furthermore provides a change speed mechanism for the spindle conveniently located at the rear of the column. Because of the independent mounting of the spindle and the drive thereof from the gear 25 at its extreme rear end, the cutter end of the spindle is entirely free from lateral thrust tending to distort the same out of alignment. The column is so constructed that the machine may readily be driven either from the base or from an overhead countershaft. The spindle and the table feeding mechanism are driven from the same source and the speed of each may be changed independently of the other. It should be understood that the accompanying drawings are illustrative only of these and other advantages and improvements comprising the invention and that modifications thereof within the scope of the following claims are comprised within the scope of the invention.

What I claim is:

1. In a machine of the class described, the combination of a column, a spindle rotatably supported therein, a sleeve loosely and concentrically mounted over the spindle and supported in spaced bearings in the column independently of the spindle, a shaft in the column parallel with the spindle and sleeve, two gears secured to the shaft, two gears on the spindle and sleeve respectively meshing with the said two gears on the shaft whereby to drive the spindle from the sleeve, and power means for driving the sleeve.

2. In a machine of the class described, the combination of a column, a spindle rotatably supported in bearings therein, a sleeve mounted in spaced relation to and concentrically over the spindle and supported in other bearings in the column independently of the spindle, a shaft in the column parallel with the spindle and sleeve, two gears secured to the shaft, two gears on the spindle and sleeve respectively meshing with the said two gears on the shaft whereby to drive the spindle from the sleeve, and power means for driving the sleeve.

3. In a machine of the class described, the combination of a column, a spindle rotatably supported therein, a sleeve loosely and concentrically mounted over the spindle and supported in bearings in the column independently of the spindle, a driving pulley on the sleeve, a shaft in the column parallel to the spindle and sleeve, two gears secured to the shaft, and two gears on the spindle and sleeve respectively meshing with the said two gears on the shaft whereby to drive the spindle from the sleeve, the column and cooperating parts being such that the pulley may be belt operated either from a motor in the base of the column or from an overhead countershaft.

4. In a machine of the class described, the combination of a column, a spindle rotatably supported therein, a sleeve loosely and concentrically mounted over the spindle and supported in bearings in the column independently of the spindle, a shaft in the column parallel with the spindle and sleeve, two gears secured to the shaft, two gears on the spindle and sleeve respectively meshing with the said two gears on the shaft whereby to drive the spindle from the sleeve, and a motor in the base of the column operatively connected to the sleeve.

5. In a machine of the class described, the combination of a column, a spindle rotatably supported therein, a sleeve loosely and concentrically mounted over the spindle and supported in bearings in the column independently of the spindle, a drive pulley on the sleeve, a shaft in the column parallel with the spindle and sleeve, two gears secured to the shaft, two gears on the spindle and sleeve respectively meshing with the said two gears on the shaft whereby to drive the spindle from the sleeve, a motor in the base of the column, and a belt operatively connecting the motor and pulley.

6. In a machine of the class described, the combination of a column, a spindle rotatably supported therein, a sleeve loosely and concentrically mounted over the spindle, a shaft in the column parallel with the spindle and sleeve, the spindle and shaft extending outwardly of the column at the rear thereof, a pair of intermeshing gears respectively mounted on the sleeve and shaft, a second pair of intermeshing gears mounted on the rear ends of the shaft and spindle outside of the column, the last two gears being interchangeable and adapted to have other gears substituted therefor to vary the speed of the spindle relative to the sleeve, and power means for driving the sleeve.

7. In a machine of the class described, the combination of a column, a spindle rotatably supported therein, a sleeve loosely and concentrically mounted over the spindle and supported in bearings in the column independently of the spindle, a shaft in the column parallel with the spindle and sleeve, a gear on the sleeve meshing with a gear on the shaft, a gear on the spindle meshing with a second gear on the shaft, the two last gears being interchangeable to vary the speed of the spindle relative to the sleeve, and power means for driving the sleeve.

8. In a machine of the class described, the combination of a column, a spindle rotatably supported therein, a sleeve loosely and concentrically mounted over the spindle and supported in bearings in the column independently of the spindle, a shaft in the column parallel with the spindle and sleeve, the spindle and shaft extending outwardy at the rear of the column, a pair of intermeshing gears respectively mounted on the sleeve and shaft, a second pair of intermeshing gears mounted on the rear ends of the shaft and spindle, the last two gears being interchangeable and adapted to have other gears substituted therefor to vary the speed of the spindle relative to the sleeve, and power means for driving the sleeve.

9. In a machine of the class described, the combination of a column, a spindle rotatably supported therein, a sleeve loosely and concentrically mounted over the spindle, a shaft in the column parallel with the spindle and sleeve, the spindle and shaft extending outwardly of the column at the rear thereof, a pair of intermeshing gears respectively mounted on the sleeve and shaft, a second pair of intermeshing gears mounted on the rear ends of the shaft and spindle outside of the column, the last two gears being interchangeable and adapted to have other gears substituted therefor to vary the speed of the spindle relative to the sleeve, power means for driving the sleeve, and a work support feeding mechanism including change speed gearing operated from the said shaft, the spindle speed and the said feeding mechanism speed each being adjustable independently of the other.

10. In a machine of the class described, the combination of a column, a work support, a spindle rotatably supported in the column, a sleeve loosely and concentrically mounted over the spindle and supported in bearings in the column independently of the spindle, a shaft in the column parallel with the spindle and sleeve, two gears secured to the shaft, two gears on the spindle and sleeve respectively meshing with the said two gears on the shaft whereby to drive the spindle from the sleeve, power means for driving the sleeve, and work support feeding mechanism, including change speed gearing, operated from the said shaft.

11. In a machine of the class described, the combination of a column, a spindle rotatably supported therein, a sleeve loosely and concentrically mounted over the spindle, a shaft in the column parallel with the spindle and sleeve, the spindle and shaft extending outwardly at the rear of the column, a pair of intermeshing gears respectively mounted on the sleeve and shaft, a second pair of intermeshing gears mounted on the rear ends of the shaft and spindle, the last two gears being interchangeable and adapted to have other gears substituted therefor to vary the speed of the spindle relative to the sleeve, power means for driving the sleeve, a work support feeding mechanism, including change speed gearing, operated from the said shaft, and a casing on the rear of the column enclosing the said two interchangeable gears and the change speed gearing, the casing being provided with a removable cover plate whereby to render the change gears readily accessible.

12. In a milling machine, the combination of a column, a rotary spindle therein, a work support thereon, an overarm mounted on the top of the column and normally extending outwardly at the front of the machine over the work support, and bolts extending vertically through holes in the arm and threaded into the column for rigidly securing the arm to the column, the construction being such that the arm may be displaced on the column to extend outwardly at the rear of the machine and secured in such position by the same means thereby leaving a free work space above the support.

13. In a milling machine, the combination of a column, a rotary spindle therein, a work support thereon, an overarm rigidly and non-slidably mounted on the top surface of the column, one end of the overarm normally extending outwardly at the front of the machine over the work support, and means for so securing the arm to the column, the construction being such that the arm may be displaced on the column to extend the said one end thereof outwardly at the rear of the machine thereby leaving a free work space above the support, the same means being adapted to secure the arm to the column in either of the said positions.

14. In a milling machine, the combination of a column, a rotary spindle therein, a work support thereon, an overarm mounted on the column and normally extending outwardly at the front of the machine over the work support, vertically extending bolts for securing the arm to the column, a pump mounted on the column beneath the arm, a priming pipe extending from the pump upwardly through the arm, the construction being such that the arm may be displaced on the column about the said pipe as an axis and secured in such displaced position with the arm extending outwardly at the rear of the machine thereby leaving a free work space above the support.

15. In a milling machine, the combination of a column, a spindle rotatably mounted therein, and a driving pulley within the column operatively connected to the spindle, the construction of the column being such that the pulley may be belt-driven either from a motor at the base of the column or from an overhead countershaft.

16. In a milling machine, the combination of a column, a spindle rotatably mounted therein, and a driving pulley within the column adjacent and operatively connected to the spindle, the column being hollow beneath the pulley thereby providing for the belt operation of the pulley from the base of the machine, openings also being provided in the column to provide for the belt operation of the pulley from an overhead countershaft.

17. In a milling machine, the combination of a column, a spindle rotatably mounted therein, a driving pulley within the column adjacent and operatively connected to the spindle, the column being hollow beneath the pulley thereby providing for the belt operation of the pulley from the base of the machine, openings also being provided in the column to provide for the belt operation of the pulley from an overhead countershaft, belt guiding means adapted to be secured to the column over the said openings when operating the pulley from an overhead countershaft, and cover plates adapted to be secured to the column over the said openings when operating the pulley from the base of the column.

In testimony whereof, I hereto affix my signature.

JERRY J. LA DUCER.